(12) United States Patent
Mecham

(10) Patent No.: US 6,899,097 B1
(45) Date of Patent: May 31, 2005

(54) SOLAR BLACKBODY WAVEGUIDE FOR EFFICIENT AND EFFECTIVE CONVERSION OF SOLAR FLUX TO HEAT ENERGY

(76) Inventor: Travis W. Mecham, 10800 S. 241 W. Ave., Sapulpa, OK (US) 74066

( * ) Notice: Subject to any disclaimer, the term of this patent is extended or adjusted under 35 U.S.C. 154(b) by 0 days.

(21) Appl. No.: 10/853,849

(22) Filed: May 26, 2004

(51) Int. Cl.[7] .................................................. F24J 2/40
(52) U.S. Cl. ........................ 126/591; 126/683; 126/685
(58) Field of Search .............................. 126/591, 618, 126/683, 685, 678, 698; 392/355

(56) References Cited

U.S. PATENT DOCUMENTS

| | | | | |
|---|---|---|---|---|
| 4,026,267 A | * | 5/1977 | Coleman | .................... 126/617 |
| 4,261,335 A | * | 4/1981 | Balhorn | .................... 126/602 |
| 4,461,277 A | * | 7/1984 | Pardo | .................... 126/573 |
| 4,483,320 A | * | 11/1984 | Wetzel et al. | ................ 126/584 |
| 4,682,582 A | | 7/1987 | Zsida | |
| 4,841,946 A | | 6/1989 | Marks | |
| 4,982,723 A | | 1/1991 | Mori | |
| 5,275,149 A | * | 1/1994 | Ludlow | ...................... 126/686 |
| 5,511,145 A | | 4/1996 | Bailey et al. | |

* cited by examiner

Primary Examiner—Stephen Gravini
(74) Attorney, Agent, or Firm—Molly D. McKay

(57) ABSTRACT

A solar blackbody waveguide that captures and uses sunlight to heat a thermal working or heat transfer fluid. Solar cell arrays capture the sunlight. The arrays are movably mounted on solar towers to track the daily movement of the sun and to maintain the proper angle with the horizon throughout the year. The arrays direct the light into a series of light pipes to deliver the light into a solar coil located within an underground insulated pipeline. Energy from the light rays is absorbed by the solar coil and transferred to the thermal working fluid or heat transfer fluid flowing between the solar coil and the insulated pipeline. The energy laden thermal working or heat transfer fluid is removed from the downstream end of the insulated pipeline so that it can be used with existing technologies, such as with a combined cycle gas turbine, boiler, or steam generator.

30 Claims, 12 Drawing Sheets

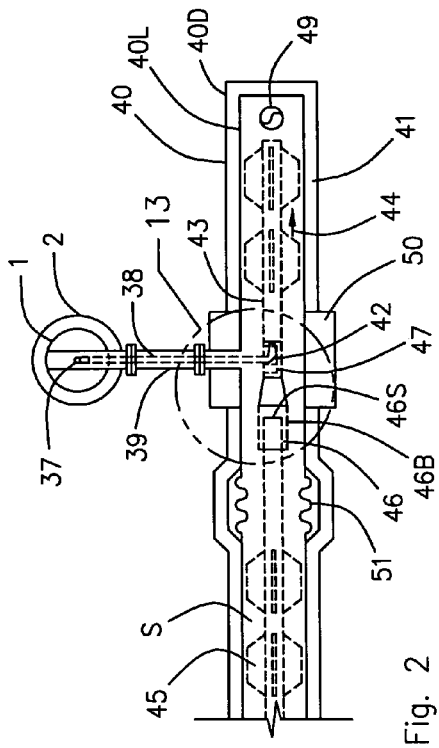
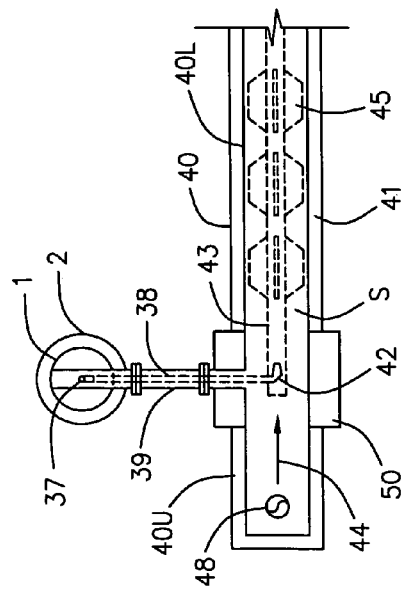
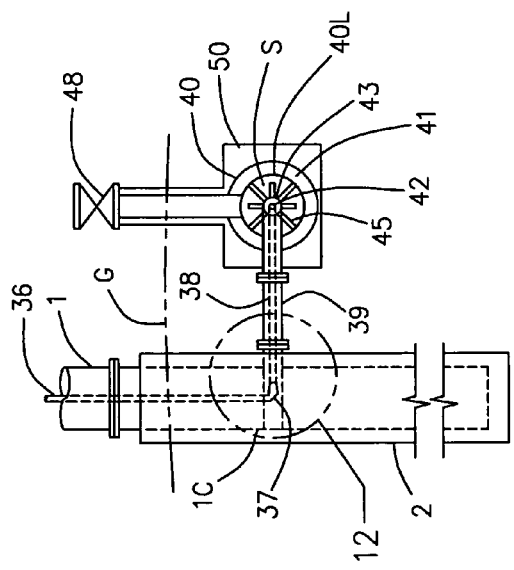
Fig. 2
Fig. 3

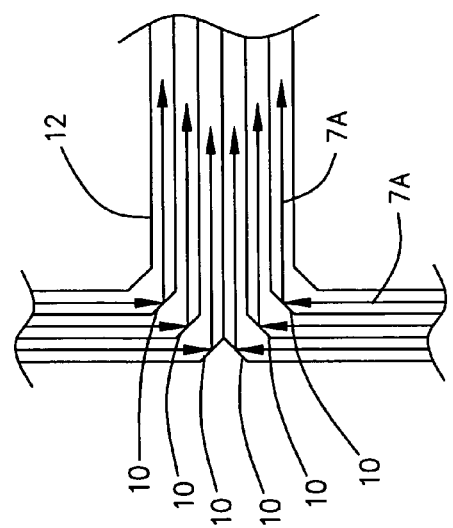
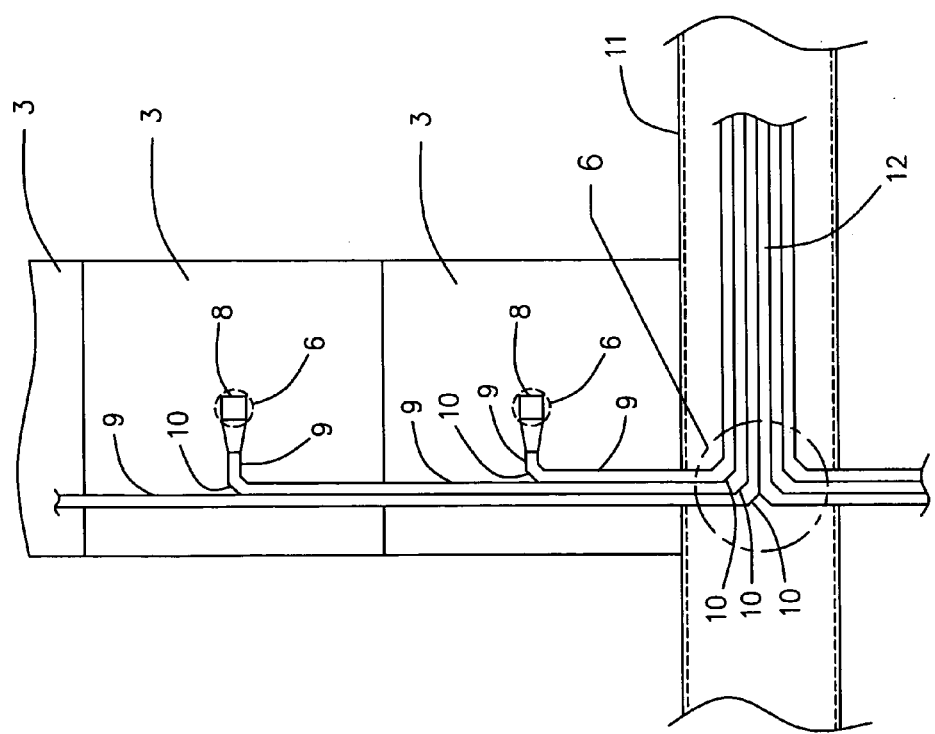

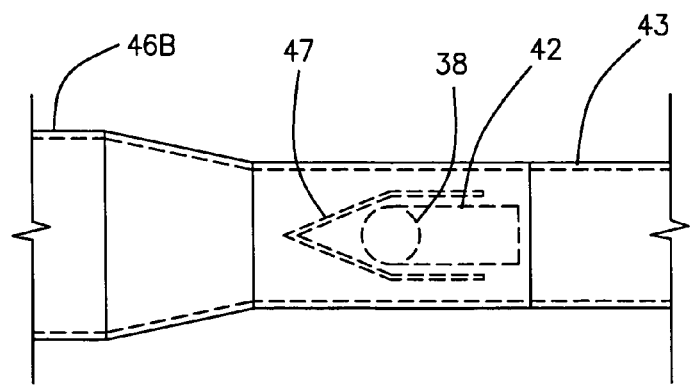
Fig. 14
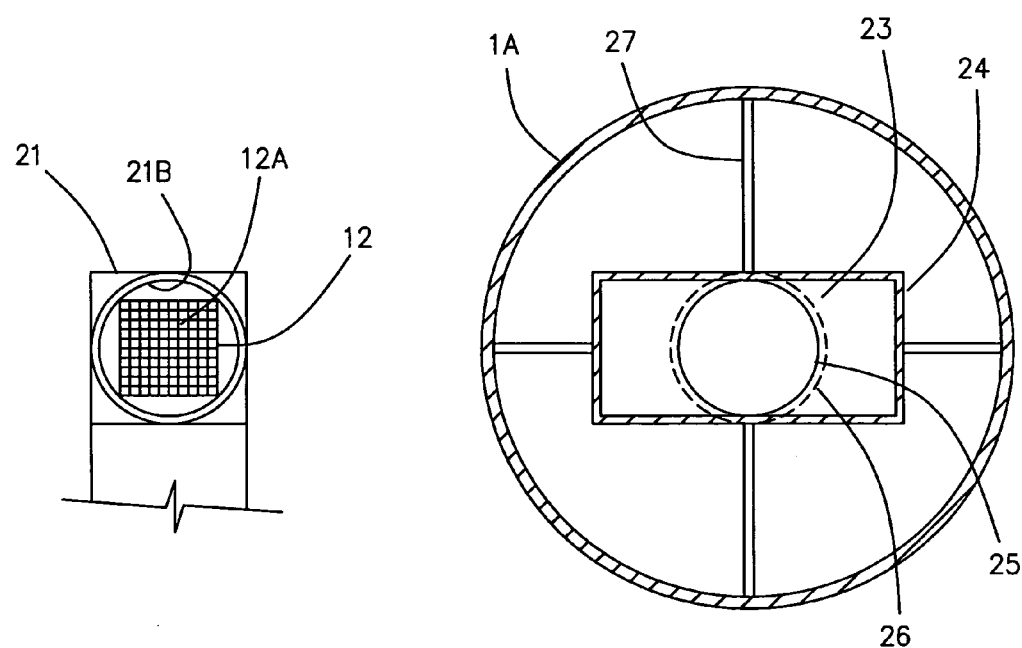
Fig. 15
Fig. 16

SOLAR BLACKBODY WAVEGUIDE FOR EFFICIENT AND EFFECTIVE CONVERSION OF SOLAR FLUX TO HEAT ENERGY

BACKGROUND OF THE INVENTION

1. Field of the Invention

The present invention relates to a solar blackbody waveguide that captures and uses sunlight to heat a thermal working fluid, such as compressed air. Solar cell arrays are used to capture the sunlight. The arrays are mounted on a plurality of solar towers so that the solar cell arrays can be moved to track the daily movement of the sun and can be tilted to maintain the proper orientation as the angle of the sun with the horizon changes throughout the day and the year. The solar cell arrays direct the light rays into a series of light pipes, optical tees, optical elbows, optical reducers, and solar horns to deliver the light rays into a solar coil located within an underground insulated pipeline that is provided only a few feet away from the base of the solar towers. Energy from the light rays is absorbed by the solar coil and transferred to the pressurized thermal working fluid that flows through an annular space provided between the solar coil and the insulated pipeline. The energy laden thermal working fluid is removed from the annular space at a downstream end of the insulated pipeline so that it can be used with existing technologies, such as with a combined cycle gas turbine. The invention can be used in association with any type of commercial or industrial installation requiring hot water, steam or heat.

Once the thermal working fluid is heated, it can then be used in association with existing technologies. For example, the present invention can be used as an air preheater to heat air for use in association with a combined cycle gas turbine. If water is used as the thermal working fluid, the present invention could be used as a steam generator for use in steam cycle turbine plants or other commercial or industrial processes requiring steam.

2. Description of the Related Art

The effective use of solar flux as a source of heat to drive heat engines has been the aim of numerous thermal-solar energy technologies. Unlike photoelectric solar cells which convert solar energy directly into electrical energy, thermal-solar technologies convert solar energy into heat which is then converted into mechanical energy and finally into electrical energy. Typically, at the center of this conversion process in current technologies is the steam or Rankine cycle.

Low cost production of electricity using current steam cycle technologies is based on magnitude-of-scale production. Production of electricity in the Megawatt (MW) range requires enormous amounts of heat. Assembling enough energy from weak solar energy in a single location to power a generator in this range remains the defining technical challenge of this form of solar energy.

The low energy-density of ambient sunlight requires that the geometry of concentrator assemblies be very large. Assembling enough energy in one location to power a large heat engine has been handled by three primary methods. The first method uses thermal transfer fluid to accumulate heat as it passes from one incremental heat generator to another. The second method transmits large quantities of solar energy over large distances in a nearly lossless manner to a single "receiver" point. The third method generates electricity using small generator systems and the total produced power is then assembled via a distributed electrical bus.

Systems involving each of all of these three methodologies have been developed to the point of operation. However, each system has introduced its own technical complications, thermal losses, and inefficiencies as described briefly below.

Several trough systems were built in the mid to late 1980's. One such system was the parabolic trough system. This type of system incrementally accumulates energy by using a heat transfer fluid. Sunlight is focused using a parabolic trough-shaped mirror on to a pipe containing a heat transfer fluid, typically thermal oil. This hot oil is passed successively through a number of parabolic trough concentrators until the temperature of the oil is heated to approximately 390° C. (735° F.). This hot oil is then passed through a heat exchanger to generate superheated steam from which electricity is generated using a conventional steam turbine.

The parabolic trough system has several drawbacks. This system has high thermal losses due to the fact that the oil-filled pipe at the center of the concentrator trough is not insulated and re-radiates the accumulated heat back into space. Also, not all the solar energy incident on the pipe containing the heat transfer fluid is absorbed by the fluid. In fact, most of the energy is reflected. In addition, use of a heat exchanger in the steam generator loop increases the overall inefficiencies of the system. These components combine to limit the gains that can be acquired from magnitude-of-scale operation. In addition, there are other limitations for these implementations since these systems do not track the sun from east to west, although they do track the seasonal inclination angle. As a result, they are typically constructed with a "due-south" orientation and are most effective in the late morning to early afternoon.

At least two power tower systems were built in the mid 1980's to mid 1990's. This type of system concentrates sunlight over a large area by transmitting it in a lossless manner through ambient air to a receiver point located at the top of a power tower. Mirrors or heliostats are mounted on the ground surrounding the power tower. These heliostats track the sun and reflect the light from the sun up to the power tower where a thermal fluid system is located. The power tower is in essence a large, fragmented collector dish distributed over a large area. The heat transfer fluid is molten sodium which is heated to approximately to 570° C. (1050° F.) as it passes through the receiver at the focal point of the power tower. This thermal fluid is then passed through a heat exchanger to generate superheated steam from which electricity is generated using a conventional steam turbine.

The power tower system also has several drawbacks. This system also has high thermal losses. With the receiver suspended in the air with limited insulation, it re-radiates accumulated heat back into space. Additionally, use of a heat exchanger in the steam generator loop increases the overall inefficiencies of the system. These thermal considerations combine to limit the gains that can be acquired from magnitude-of-scale construction and lower the overall thermal efficiency. In addition, there are other limitations for power towers since self-shadowing of the heliostats keeps them from providing power over the entire day.

Dish engine systems are in the advanced prototype phase with test facilities deployed in the late 1990's. These systems use an array of parabolic dish-shaped mirrors to focus solar flux to a small "receiver" located at the focal point of the parabolic mirror assembly. A thermal working fluid of water is heated to about 750° C. (1380° F.) and used directly to generate electricity using a small steam turbine attached to the dish without use of a heat exchanger. The electricity generated is collected using a system of electrical buses or collection systems for final connection to the utility electric grid. Due to the higher operating temperatures and elimination of heat exchangers, these systems have higher thermal efficiencies than parabolic troughs and power towers.

However, these dish engine systems do not overcome the same basic drawback of the other technologies, i.e. high thermal losses with the receiver suspended in the air with limited insulation and resultant with re-radiation of accumulated heat back into space. These systems can track the daily progress of the sun, and therefore, provide power for longer periods during the day. The addition of steam turbines attached to the dish generator increases the structural load-bearing requirements of the support system. The structures required to support the dish and engine can become massive and expensive to construct.

The current art in solar-thermal energy recognizes the need to effectively accumulate the necessary amounts of heat for magnitude-of-scale production. However, the means for doing this as demonstrated in the art is not entirely physically realizable. An example is shown in U.S. Pat. No. 4,982,723 where solar energy is introduced into a thermal fluid inducing a photochemical reaction. In this process, the need for accumulation of energy is recognized, but the physical mechanism for making it happen on a large scale is sketchy.

Another technology is reflected in U.S. Pat. No. 4,841,946 in which a Cassegrain reflector is used to concentrate solar flux. This concentrated flux is transported via light pipe to a cavity where the solar energy is converted into heat energy. Although this patent contains some interesting abstract concepts, it does not obtain a complete solution when scaled up for actual power production levels. This proposed technology implies (without a realizable solution) that if more energy is required, the energy from a plurality of similarly situated reflectors can be conducted to a single receiver via a plurality of light pipes. An inherent difficultly that this technology fails to overcome is the transmission losses associated with moving highly concentrated solar energy via light pipes over long distances. Although these losses are small, they are not zero, and a transmission loss of one tenth of one percent (0.1%) in a light pipe carrying one (1) MW of energy is an enormous amount of energy to be absorbed by the material from which the light pipe is constructed. Nor does this technology propose any useful method for combining light from the plurality of light pipes into a single, common light pipe for long distance transmission.

SUMMARY OF THE INVENTION

The present invention is a solar blackbody waveguide that captures and uses sunlight to heat a thermal working fluid, such as compressed air. Once the thermal working fluid is heated, it can then be used in association with existing technology. For example, the present invention can be used as an air preheater to heat air for use in association with a combined cycle gas turbine or in other industrial or commercial applications where heat, steam or hot water is needed.

The present invention employs solar cell arrays movably mounted on a plurality of solar towers so that the solar cell arrays can be moved to track the daily movement of the sun across the sky due to the rotation of the earth and can be tilted to maintain the proper orientation as the angle of the sun with the horizon changes due to the annual orbit of the earth around the sun.

The solar cell arrays direct the light rays into a series of light pipes, optical tees, optical elbows, optical reducers, and solar horns. The light rays are thus delivered through the solar towers and into a solar coil located within an underground insulated pipeline that is provided a few feet from the base of the solar towers. Energy from the light rays is absorbed by the solar coil and transferred into the thermal working fluid flowing through an annular space provided between the solar coil and the insulated pipeline. The energy laden thermal working fluid is removed from the annular space at a downstream end of the insulated pipeline so that it can be used with existing technologies, as previously described.

BRIEF DESCRIPTION OF THE DRAWINGS

FIG. 2 is a cross sectional view taken along line 2—2 of FIG. 1.

FIG. 3 is a cross sectional view taken along line 3—3 of FIG. 1.

FIG. 5 is an enlarged view of the portion of the solar cell array contained within circle 5 of FIG. 4.

FIG. 6 is an enlarged view of the portion contained within circle 6 of FIG. 5 showing the bundle of optical waveguides found within the structural spar element of the solar tower.

FIG. 14 is a cross sectional view taken along line 14—14 of FIG. 13.

FIG. 15 is a cross sectional view taken along line 15—15 of FIG. 9 shown with the waveguide centering ring removed.

FIG. 16 is a cross sectional view taken along line 16—16 of FIG. 9.

DETAILED DESCRIPTION OF THE PREFERRED EMBODIMENT THE INVENTION

Figure 1:
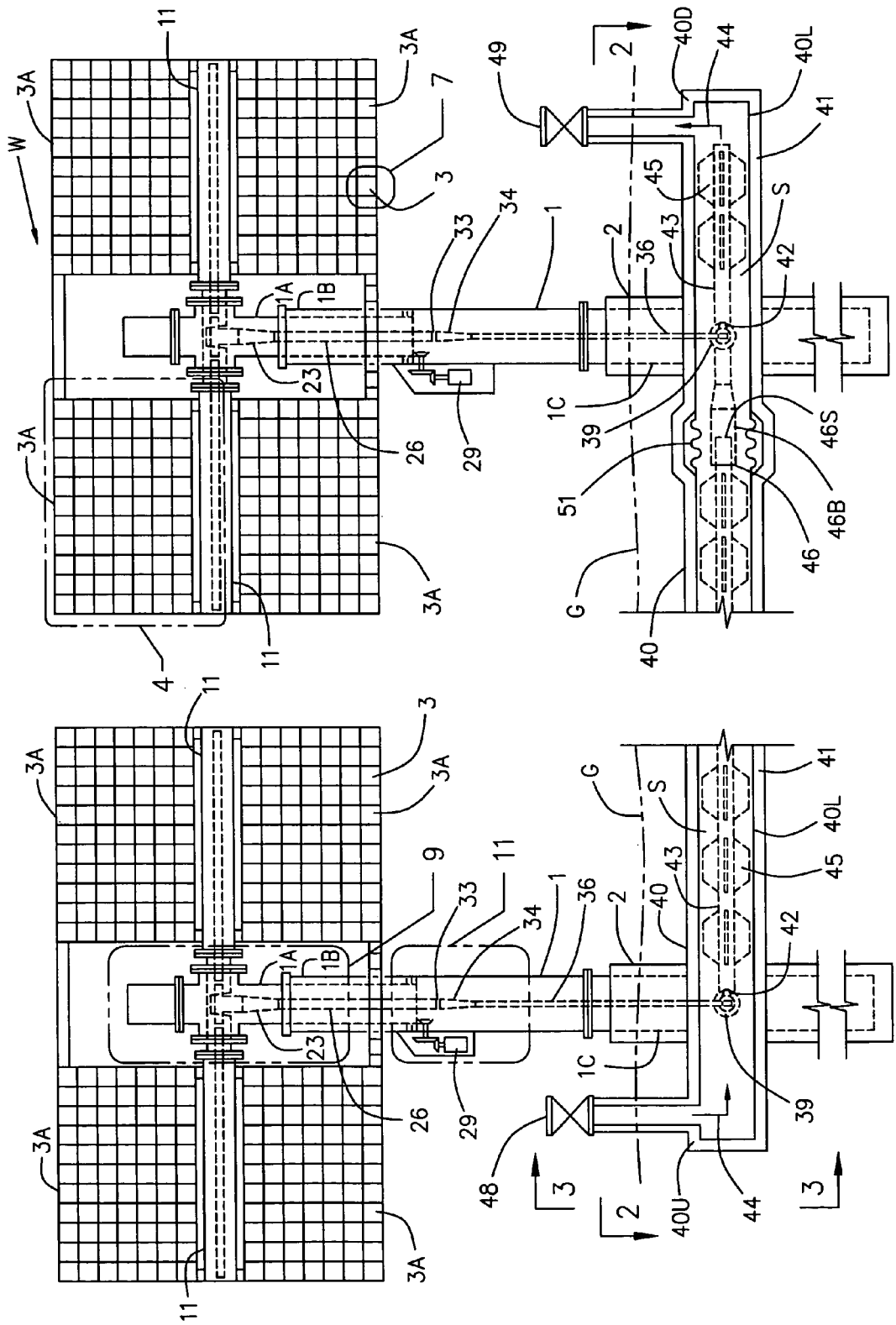
FIG. 1 is a partially cut away side view of a solar backbody waveguide constructed in accordance with a preferred embodiment of the present invention, showing the upstream and downstream ends of the insulated pipeline.
Figure 4:
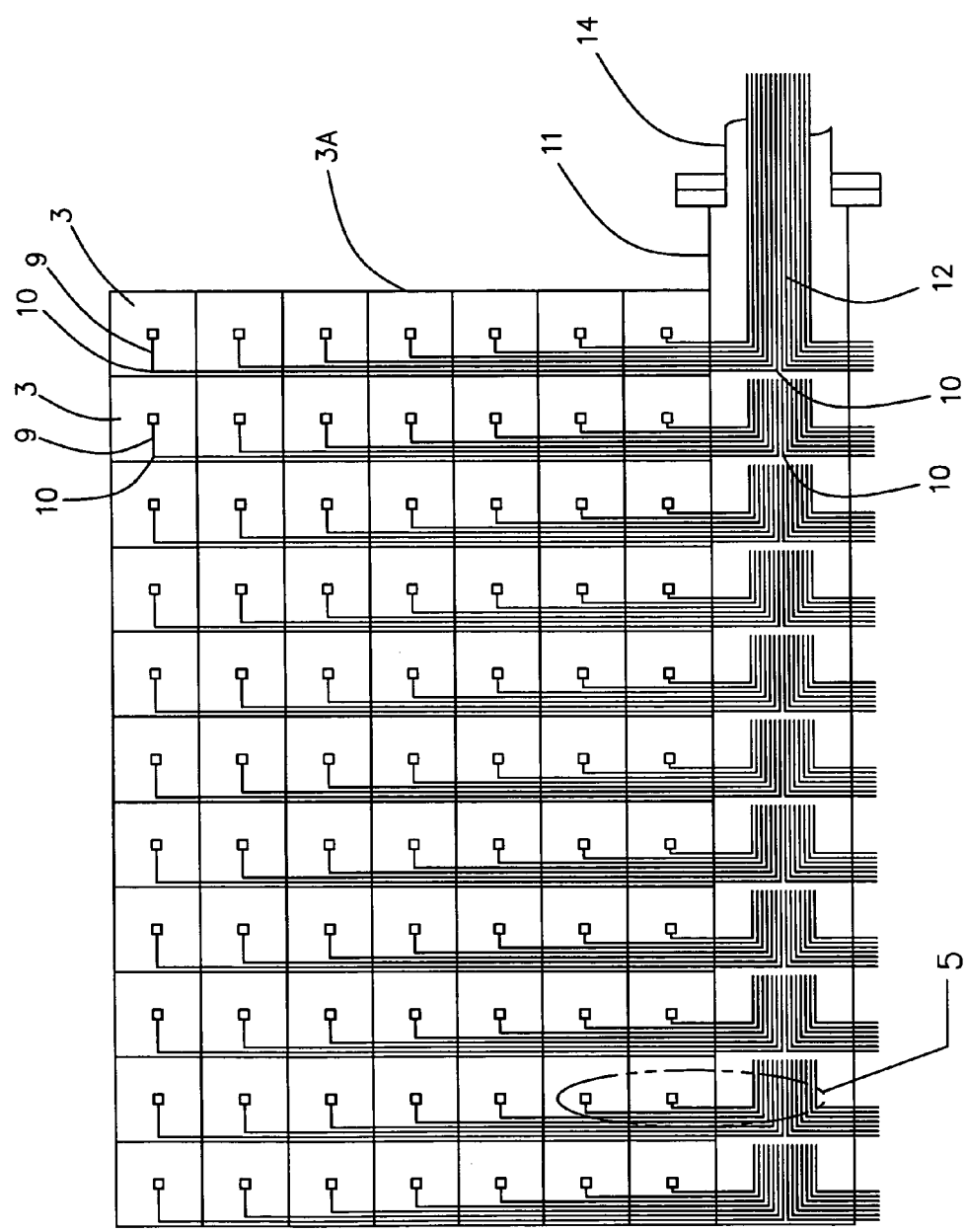
FIG. 4 is an enlarged view of a quadrature portion of the solar cell array contained within box 4 of FIG. 1.

Referring now to the drawings and initially to FIG. 1, there is illustrated a solar blackbody waveguide W for efficient and effective conversion of solar flux to heat energy that is constructed in accordance with a preferred embodiment of the present invention. As illustrated, the invention W consists of one or more interconnected solar towers 1 to efficiently and effectively capture and concentrate energy in the form of solar flux and to efficiently convert this solar energy into useable forms of heat energy. This embodiment of the invention W is an improvement to simple-cycle and combined-cycle gas turbine heat engines by preheating the air (thermal working fluid) used prior to the combustion chamber of the gas turbine, as will be more fully described hereafter in association with FIG. 17. However, the invention is not limited to this application and is applicable to numerous other heating cycles using different thermal working fluids or heat transfer fluids other than air. Changes in the thermal fluid could easily be adapted for improvement to the closed, water-based Rankine Cycle of a standard steam turbine, or other commercial or industrial process requiring steam or heated water.

Beginning with FIG. 1, the invention will be described in detail. The solar tower 1 includes a structural foundation 2 to support the solar tower 1. The solar tower 1 itself is a structural element to support a plurality of optical solar cells 3. The invention employs a large number of successive solar towers 1.

Figure 7:
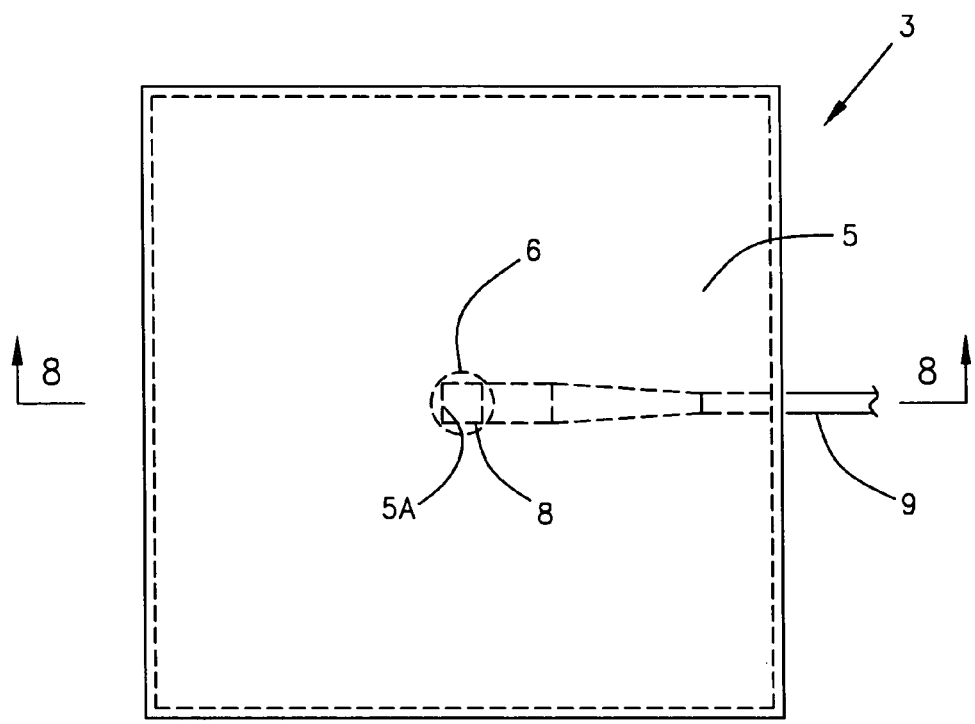
FIG. 7 is an enlarged view of one of the optical cells contained within circle 7 of FIG. 1.
Figure 8:
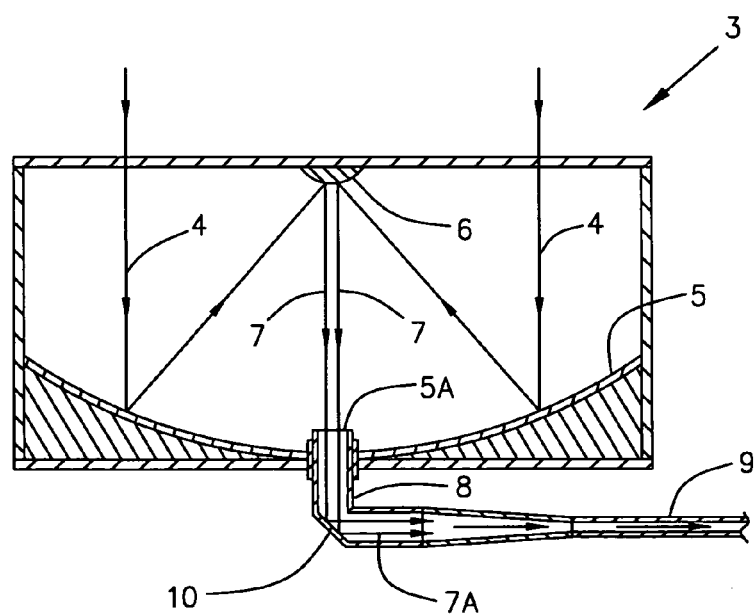
FIG. 8 is a cross sectional view taken along line 8—8 of FIG. 7.

Referring now to FIGS. 7 and 8, each optical solar cell 3 is a modularly designed parabolic mirror and associated housing constructed out of inexpensive plastic material. The optical solar cells 3 use a reflecting geometry similar to telescope technologies known as a Cassegrain focus. In telescopes that employ Cassegrain focus, parallel incident light rays are reflected from a primary parabolic mirror toward a central focal point, i.e. a secondary hyperbolic mirror. The light is then reflected from the secondary hyperbolic mirror to a focal point through a hole in the center of the primary parabolic mirror.

Referring now to FIG. 8, the geometry of the optical solar cell 3, which is a modified Cassegrain reflector, is similar to telescopes in that parallel incident light rays 4 are reflected from a primary parabolic mirror 5 toward a central focal point, in this case a secondary parabolic mirror 6 instead of the secondary hyperbolic mirror employed in a telescope. The light is then reflected from the secondary parabolic mirror 6 to a focal point through a hole 5A in the center of the primary parabolic mirror 5. However, the secondary parabolic mirror 6 of the optical solar cell 3 is different in a key aspect from the secondary hyperbolic mirror of telescope technology. The secondary parabolic mirror 6 that is attached to the modular cover of the optical solar cell 3 causes the reflected light to travel in parallel rays 7 through the hole 5A in the primary parabolic mirror 5. This is unlike a telescope which uses a secondary hyperbolic mirror to reflect the light in converging, non-parallel rays to a concentrated, focal point. In the present invention, it is desirable that the light rays 7 be parallel rather than convergent.

Referring now to FIGS. 4–8, once the parallel light rays 7 pass through the center hole 5A of the primary parabolic mirror 5, they enter into an optical waveguide or light pipe 8. From the point that the light rays 7 enter the waveguide 8, the path of the light rays contained within the solar blackbody waveguide will be referred to as light rays 7A regardless of whether the light rays 7A are parallel, converging or diverging.

The light pipe 8 is constructed primarily of silica glass material with a square cross section, as can be best seen in FIG. 7. This glass is cast in a manner to reduce the impurities and thereby reduce transmission losses. The concentrated light rays 7A are further focused into a smaller waveguide or light pipe 9 that has a smaller cross-section, as illustrated in FIG. 8.

All of the light pipes 9, optical elbows 10 and 37, optical tee 21, and optical reducers 23 and 34 used in the invention are similar to fiber optic materials and each has an outer cladding of plastic or other material with an index of refraction of approximately 1.40 compared to the higher index of refraction of approximately 1.60 of silica glass. This increases the effectiveness of total internal reflection of these light pipes 9, optical elbows 10 and 37, optical tee 21, and optical reducers 23 and 34. Finally, the outer layer of the cladding of each light pipe 9, optical elbows 10 and 37, optical tee 21, and optical reducers 23 and 34 is coated with a thin metallic foil to completely contain all of the light inside.

Due to the low level of impurities, the light rays 7A travel in a lossless manner making 90 degree reflections at the each optical elbow 10, as illustrated in FIGS. 5 and 6. Thus, the light rays 7A travel from each of the optical solar cells 3 into the center of a structural spar element 11 provided on the solar tower 1 for the purpose of supporting the array 3A of optical solar cells 3 provided on the solar tower 1. Two structural spar elements 11 are provided on each solar tower 1 so that one of the structural spar elements 11 is provided on each side of the solar tower 1 and each of the structural spar elements 11 supports two arrays 3A of optical solar cells 3. The square cross-section of each of the smaller waveguides 9 increases the stacking factor facilitating bundling of the waveguides 9 into a tight bundle 12 of smaller fibers.

Figures 9, 10:
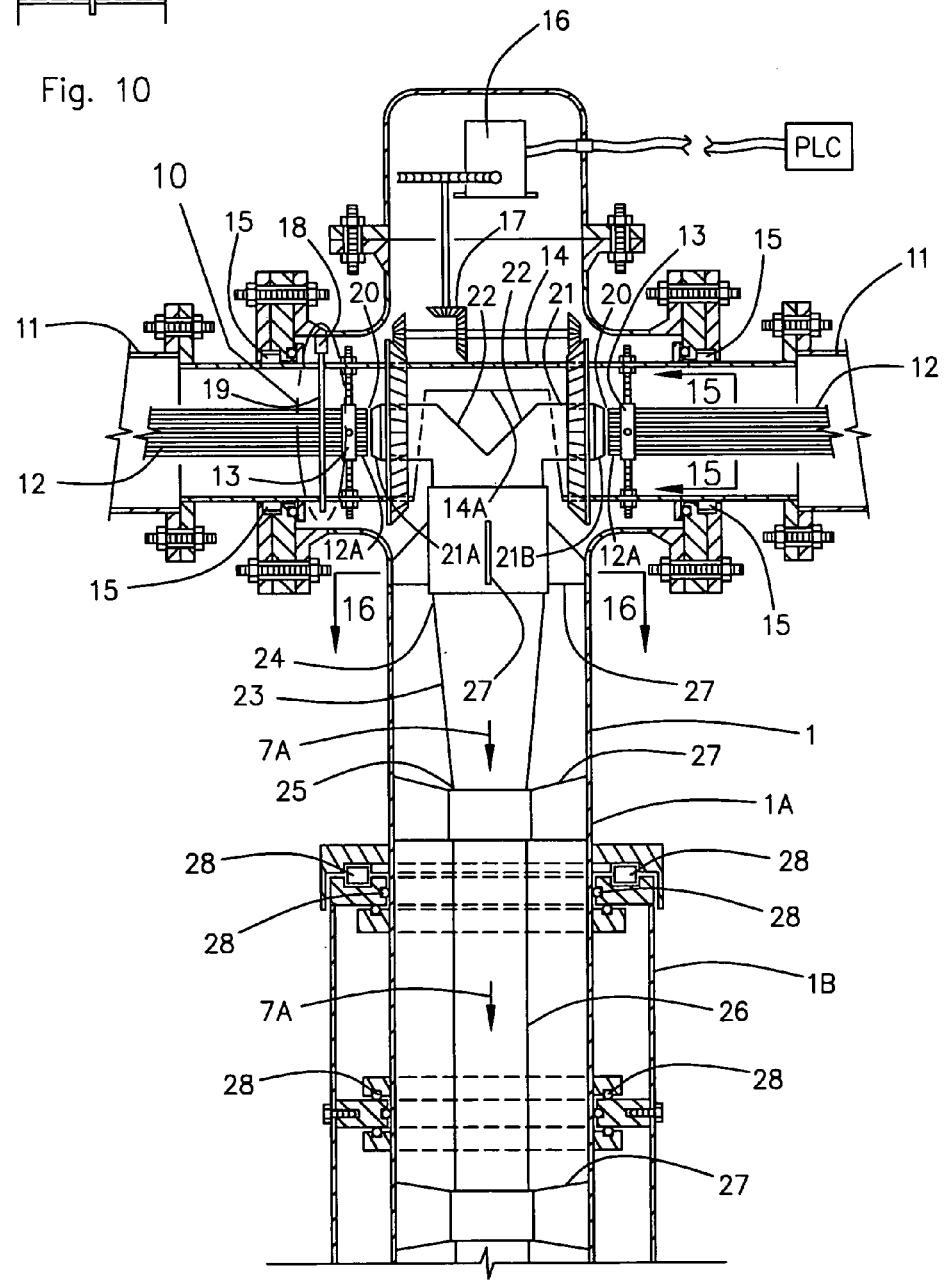
FIG. 9 is an enlarged view of the portion of the solar tower contained within box 9 of FIG. 1.
FIG. 10 is an enlarged view of the optical angle reader and CD contained within circle 10 of FIG. 9.

FIGS. 9 and 10 illustrate altitude tracking mechanism of the invention W. Altitude tracking is necessary because of the different angles that the sun makes with the horizon due to the variation of the seasons and daily movement of the sun through the sky. As the small waveguides 9 from each of the individual optical solar cells 3 approach the center vertical structure of the solar tower 1, they are bundled together and positioned with a waveguide centering ring 13. This ring 13 centers all of the waveguides 9 symmetrically about the horizontal axial centerline of a central cylindrical structural spar element 14 which penetrates the vertical solar tower structure 1. Each of the pair of structural spar elements 11 is secured to the central cylindrical structural spar element 14.

The central structural spar element 14 is provided with an opening 14A therein through which the optical tee 21 extends and there is sufficient clearance between the optical tee 21 and the opening 14A to allow the central structural spar element 14 to rotate as a means of rotating the structural spar elements that are attached to the central structural spar element 14. Bearings 15 provided in the solar tower housing 1 permit rotation of the spar elements 11 and 14 to vary the pitch angle of the solar optical cell arrays 3A as a means of tracking the altitude angle of the daily movement of the sun through the sky. The motive force to track the altitude angle is provided by an electric motor 16 and gear train 17 rotating the spars 11 into proper position to track the sun.

The proper tracking angle is calculated from the latitude and longitude of the solar tower location via a small programmable logic controller (PLC) that controls the operation of the electric motor 16. The programmable logic controller PLC will generally be located remote from the solar tower 1 and will serve to operate one or more solar towers 1 for the invention W. An optical angle reader 18 that uses an optical compact disk or CD reader to read precise angular data encoded on a compact disk or CD 19 to keep track of the actual angle. This angular data is used in a feedback control loop to control the position of the altitude angle of the spars 11 and thus the position of the attached optical solar arrays 3A.

In order to provide the mechanical clearance required for the axial movements required to track the altitude angle of the sun's movement, an air gap 20 is provided at an interior end 12A of each bundle between the interior end 12A and the central large optical element called the optical tee 21. At each air gap 20, the light rays 7A from each of the interior ends 12A of the bundles 12 exit the small waveguides 9 and cross the air gap 20 to enter into the optical tee 21.

Referring now to FIG. 15, each bundle 12 of small waveguides 9 has a square packing configuration. However, the two entrances 21A and 21B to the optical tee 21 are each circular in configuration. No light is lost at the air gap 20 because the circular configuration of each entrance 21A and 21B to the optical tee 21 is large enough to receive all of the light from the bundle 12.

The optical tee 21 is cast of high-purity, low expansion silica glass material with a high-temperature thermo-plastic cladding with an exterior metal foil coating. The optical tee 21 is provided with two prism surfaces 22 that are each angled at 45 degrees. These surfaces 22 reflect the light rays 7A vertically downward after the light rays 7A cross the air gaps 20 and encounter the surfaces 22.

Referring now to FIGS. 9 and 16, as the light rays 7A pass downward within the central column of the solar tower 1, they pass through an optical reducer 23. The optical reducer has an upper end 24 that is larger and rectangular in cross section, and the optical reducer 23 gradually reduces in size and changes in shape along its length so that its lower end 25 is smaller and is circular in cross section. The optical reducer 23 concentrates the light rays 7A and causes the light rays 7A to undergo a change in configuration as the optical reducer 23 changes shape from rectangular to circular passing from the upper rectangular end 24 of the optical reducer 23 to the lower circular end 25 of the optical reducer 23. From there, the light rays 7A continue downward in the center of the solar tower 1 through a circular waveguide 26. Like the previously described waveguides 8 and 9, this circular waveguide 26 is cast of high-purity, low expansion silica glass material with a high-temperature thermo-plastic cladding and an exterior metal foil coating. The optical tee 21, optical reducer 23, and circular waveguide 26 are centered within a smaller diameter top pipe 1A of the solar tower 1 and are held in a fixed position relative to the centerline of the vertical solar tower 1 by centering devices 27.

Figure 11:
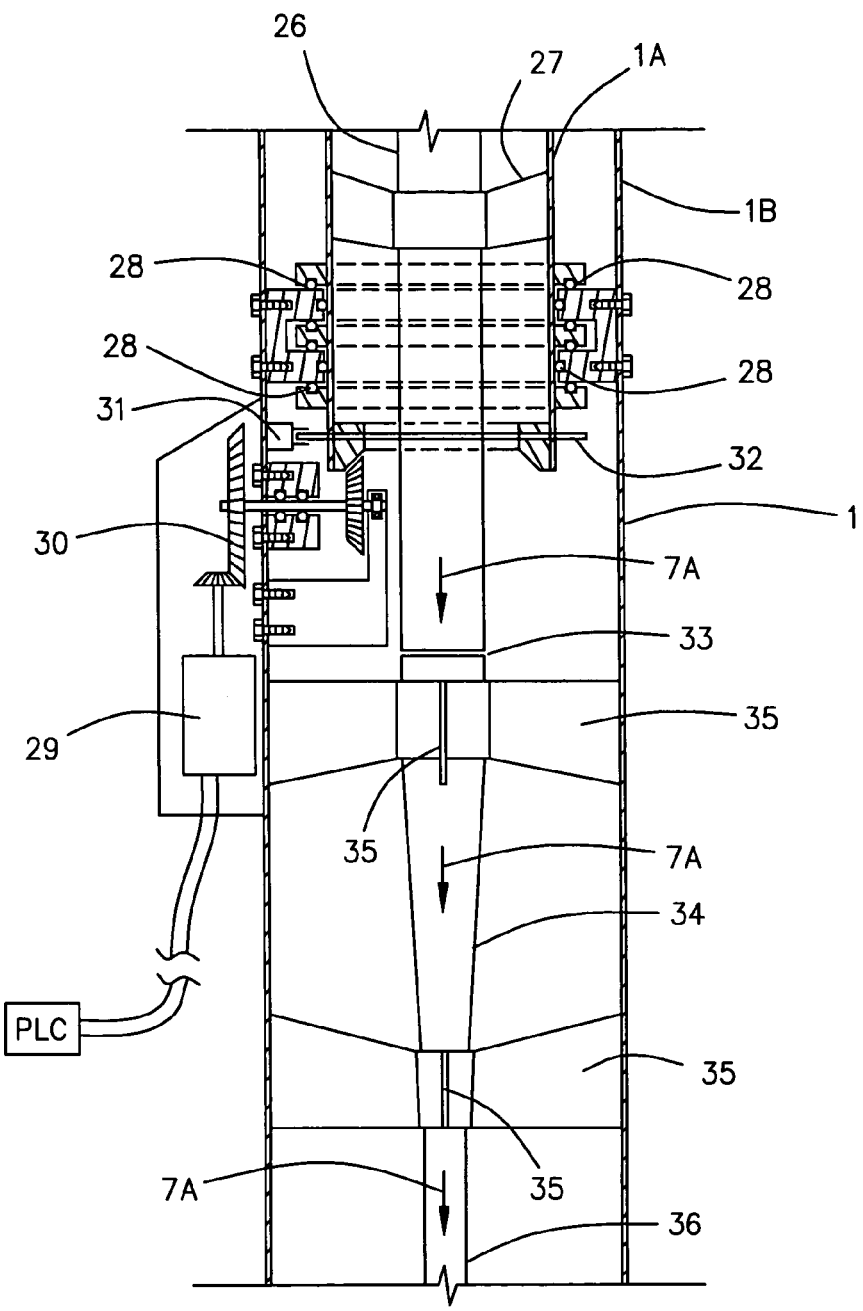
FIG. 11 is an enlarged view of the portion of the solar tower contained within box 11 of FIG. 1.
Figure 12:
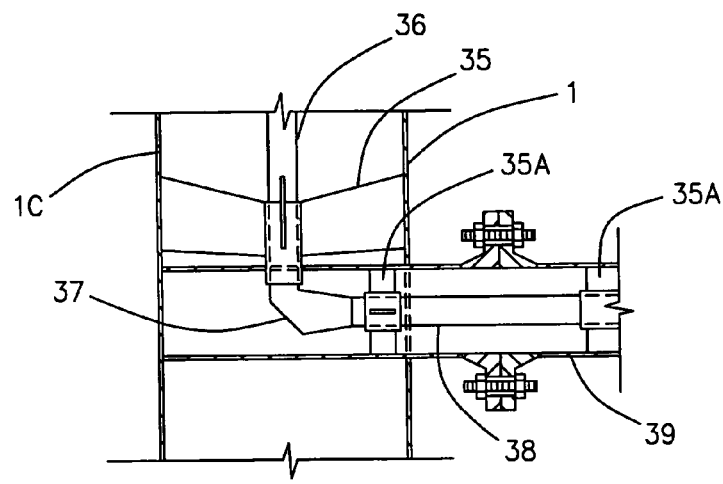
FIG. 12 is an enlarged view of the portion of the solar tower contained within circle 12 of FIG. 3.

Referring to FIGS. 9 and 11, the ability to track the sun's hourly track across the sky or the azimuth angle is provided by the pipe-in-pipe design at the top of the solar tower 1. The smaller diameter of the top pipe 1A allows it to slide inside the larger diameter pipe 1B forming the lower structure of the solar tower 1. Bearings assemblies 28 provided in the vertical solar tower structure 1 permit rotation of the top portion 1A of the solar tower 1 inside the rigidly fixed lower portion 1B of the solar tower 1 in order to vary the azimuth angle of the solar optical cell arrays 3A. This permits the solar tower 1 to track the hourly movement of the sun through the sky from east to west so that the solar cells arrays 3A are always facing the sun. The motive force to track the azimuth angle is provided by a second electric motor 29 and a second gear train 30 rotating the top 1A of the solar tower 1 into proper position to track the sun.

The proper tracking angle is calculated from the latitude and longitude location of the solar tower 1 via the programmable logic controller (PLC) and the programmable logic controller (PLC) controls the operation of the second electric motor 29. As previously described, the programmable logic controller (PLC) will generally be located remote from the solar tower 1 and will serve to operate one or more solar towers 1 for the invention W. A second optical angle reader 31 that uses an optical CD reader to read precise angular data encoded on a second compact disk or CD 32 keeps track of the actual angle. This angular data is used in a feedback control loop to control the position of the azimuth angle of the optical solar arrays 3A.

Referring now to FIG. 11, an additional air gap 33 permits the mechanical clearance required in order to permit tracking of the azimuth angle. The light rays 7A cross this additional air gap 33 into a second, long optical reducer 34 that is centered within the larger diameter pipe 1B comprising the bottom section of the solar tower 1 and are held in a fixed position relative to the centerline of the vertical solar tower 1 by additional centering devices 35. The second, long optical reducer 34 is attached to a vertical waveguide 36. The concentrated light rays 7A exit the bottom of the reducer 34 and then travel within the vertical waveguide 36 to the bottom 1C of the solar tower 1. The bottom 1C of the solar tower 1 is normally located approximately 4–7 feet below grade or ground level G.

Referring now to FIGS. 1, 2, 3, 13 and 14, the concentrated light rays 7A travel in a circular cross-section vertical waveguide 36 to the bottom 1C of the solar tower 1. At the end of this vertical waveguide 36, the light rays 7A are reflected at an angle of approximately 90 degrees via an additional optical elbow 37. This directs the light rays 7A through a horizontal, circular cross-section waveguide 38 centered in a carrier pipe 39 by additional centering devices 35A. As illustrated in FIGS. 2, 3, 12 and 13, one end of this carrier pipe 39 penetrates the wall of large pipe 1B of the solar tower structure 1 to the outside of the solar tower structure 1 and a second end of the carrier pipe 39 enters the center of a buried, insulated pipeline 40 located approximately 6–8 feet away from the solar tower structure foundation 2. The insulated pipeline 40 is buried approximate 4–7 feet below grade G and actually consists of a small diameter bare, pipeline that is the solar coil 43 in the center of an insulated large diameter pipeline 40L. Insulation 41 provided on the larger pipeline 40L is preferably made up of a layered composite material consisting of very high temperature refractory-fiber insulation materials near the pipeline 40L, followed by mineral fiber insulation, and finally a top coat of poly-urethane insulation material to minimize heat loss.

Figure 13:
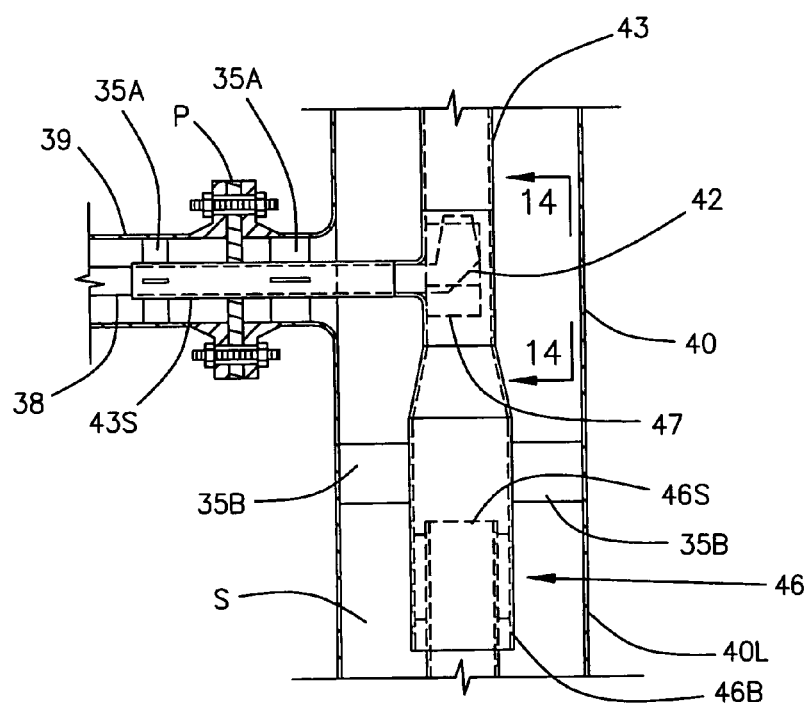
FIG. 13 is an enlarged view of the portion of the insulated pipeline contained within circle 13 of FIG. 2, shown with the insulation removed for clarity.

Referring now to FIGS. 2, 13, and 14, at the second end of the carrier pipe 39, the concentrated light rays 7A make one final reflection of approximately 90 degrees via solar horn 42. This causes the light rays 7A to enter the center of the solar coil 43 that is located at the center of the insulated larger diameter pipeline 40L and traveling in an axial direction within the interior of the solar coil 43.

Referring to FIG. 13, at each solar horn 42, the solar coil 43 is provided with a sleeve 43S that extends into the carrier pipe 39 and around which there is provided a pressure seal PS so that the carrier pipe 39 remains at atmospheric pressure on a tower side of the pressure seal PS and so that on an opposite side of the pressure seal PS, the interior of the pipeline 40L can be pressurized. Also, as illustrated in FIG. 13, because the sleeve 43S extends into the stationary carrier pipe 39, it is important that the sleeve 43S and its associated bell end 46B of the solar coil 43 not move. Constraints 35B are provided at each bell end 46B to hold the bell end 46B and its attached sleeve 43S stationary against longitudinal expansion relative to the pipeline 40L and relative to the various carrier pipes 39 that intersect with the pipeline 40L.

The solar coil 43 works like a waveguide for the concentrated light but is not lossless as is the high-purity silica glass used for transporting the solar flux in the form of light rays 7A through the solar tower 1 and into the insulated pipeline 40. Instead, the light rays 7A reflect off of the interior surfaces of the metal solar coil 43, losing some of its energy to the coil 43 on each reflection. This energy is absorbed by the coil 43 causing the temperature of the coil 43 to rise rapidly. Heat travels through the solar coil 43 to the exterior of the solar coil 43 and into a heat transfer fluid or thermal working fluid 44 such as air or water passing over in the annular space S that is provided between the coil 43 and the insulated pipeline 40. Since thermal conduction is the primary heat transfer mechanism, the solar coil 43 is equipped externally with thermal fins 45 to increase the effective surface area of the solar coil 43 and thus enhance the heat transfer for the solar coil 43 to the heat transfer or thermal working fluid 44.

In essence, the solar coil 43 acts as a long, solar power heating coil at the center of the insulated pipeline 40. Due to the geometry, the solar coil 43 acts as a lossy, blackbody waveguide absorbing nearly one hundred percent (100%) of the solar energy collected and injected into the center of the coil 43 in the form of light rays 7A. The coil 43 is preferably constructed of high temperature, poly-molybdenum steel suitable for operation at temperatures above 1200° F. Referring to FIG. 13, the solar coil 43 is constructed in sections to allow for expansion of the solar coil 43 as it is heated. Differential expansion of the solar coil sections is permitted using bell and spigot design connections 46 with the unconstrained spigot end 46S of one section of the coil 43 allowed to expand into the fixed or constrained bell end 46B of an adjacent coil section.

Adjacent solar towers 1 will be spaced apart from each other and are anticipated to be located at approximately 25–30 meter intervals along the pipeline 40. It is anticipated that each tower will collect and transfer to the solar coil 43 approximately 300 KW of energy.

Figure 19:
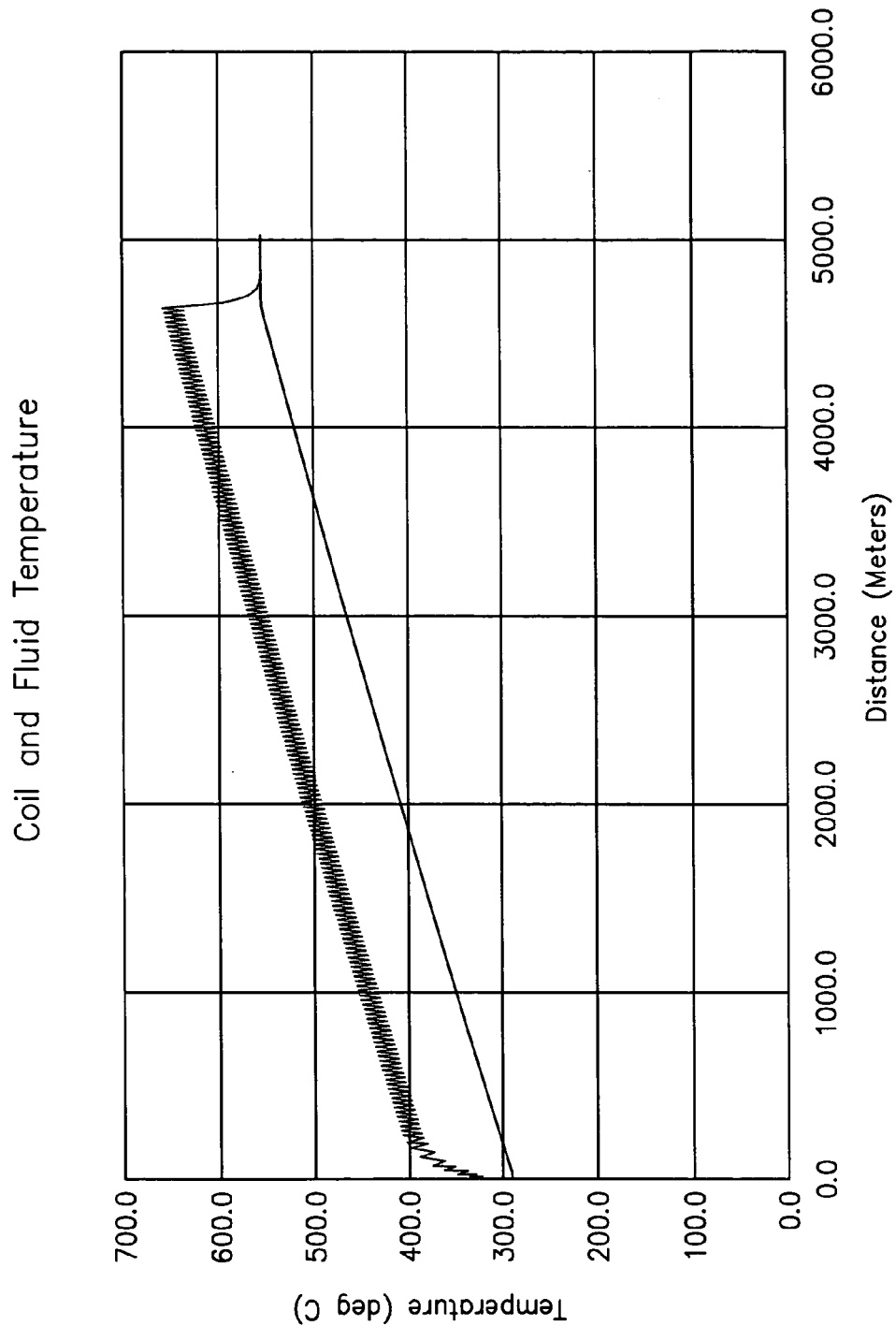
FIG. 19 is a graph showing modeled temperatures of a typical solar coil and the heat transfer fluid of the present invention as a function of distance. This graph is illustrative of temperature profile for a 60 inch diameter pipeline and a 6 inch solar coil.

FIG. 19 is a graph showing the modeled temperature of a typical coil 43 as a function of distance or length of the coil 43. The upper line on the graph represents the coil temperature that increases incrementally as the coil 43 receives additional energy in the form of light rays 7A from each of the individual solar towers 1 provided along the length of the coil 43. The graph shows maximum coil temperatures of greater than 660° C. (1030° F.) with a coil 43 length of 5000 meters. The graph shown in FIG. 19 is for demonstration purposes only to show the result of computer models of the system. This graph is provided only for illustrative purposes and actual results may vary from this graph since each system will be a uniquely engineered design.

Referring now to FIGS. 13 and 14, the solar horn 42 is a cast, high-purity, low expansion silica glass prism structure. It is capable of withstanding the high operating temperatures of the solar coil 43. Surrounding the solar horn 42 is a metal deflector shield 47 intended to deflect the residual solar flux or light rays 7A in the solar coil 43 around the solar horn 42. The shield 47 prevents light rays 7A that entered the coil 43 via solar horns 42 located upstream of the shielded solar horn 42 from striking the rear end of the shielded solar horn 42, thereby minimizing the number of reverse traveling reflections within the coil 43.

Figure 18:
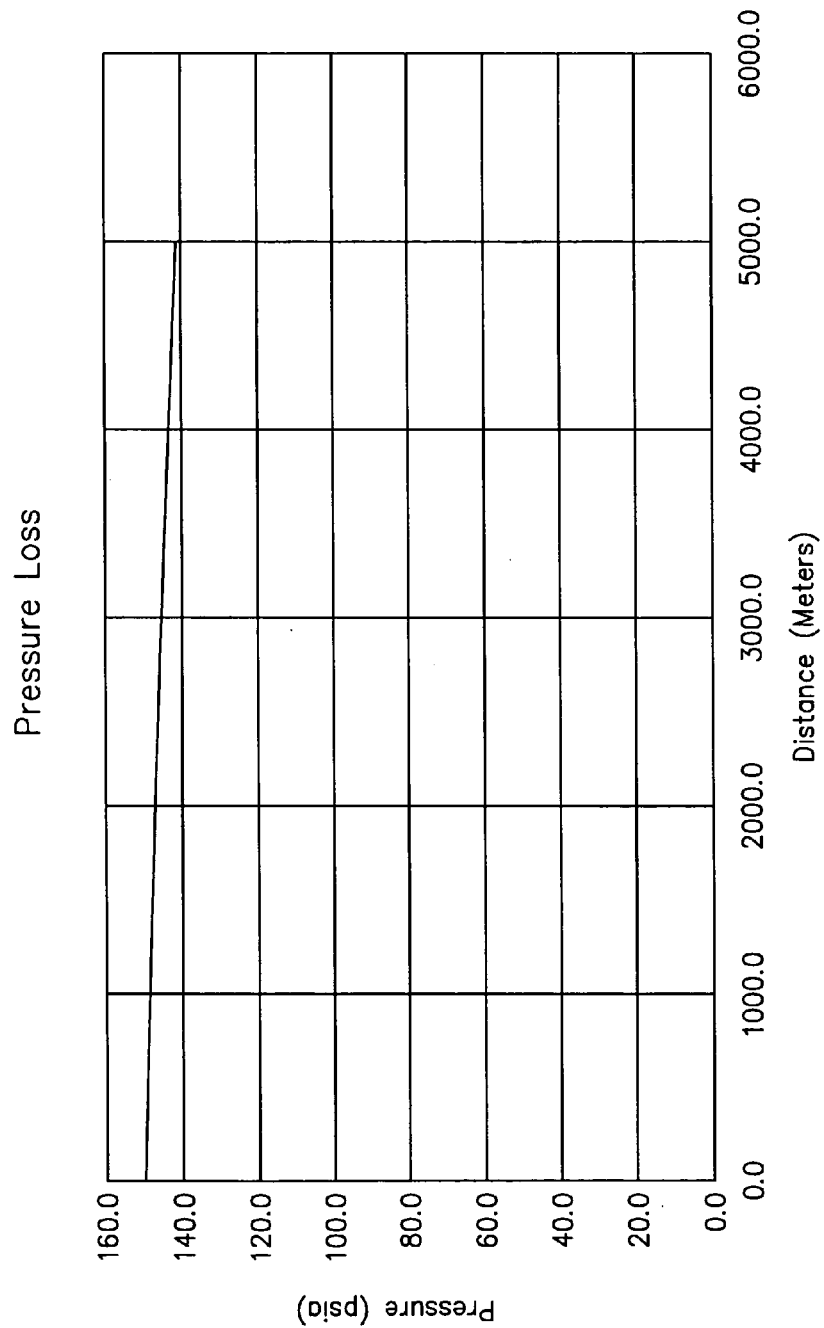
FIG. 18 is a graph showing the calculated pressure loss within the insulated pipeline of the present invention as a function of distance, with air used as the thermal working fluid. This graph is illustrative of pressure loss for a 60 inch diameter pipeline and a 6 inch solar coil.

Referring to FIG. 1, the heat transfer or thermal working fluid 44 is routed into the annular space S of the insulated pipeline 40 through an inlet valve 48 provided on an upstream end 40U of the pipeline 40 and out of the annular space S of the pipeline 40 via an outlet valve 49 provided on a downstream end 40D of the pipeline 40. FIG. 18 shows calculated pressure loss within the pipeline 40 using air as the thermal working or heat transfer fluid 44. The graph shown in FIG. 18 is for demonstration purposes only to show the result of computer models of the system. This graph is provided only for illustrative purposes and actual results may vary from this graph since each system will be a uniquely engineered design.

Other necessary, site-specific designed and engineered items are needed to complete a blackbody waveguide system W. These include concrete thrust blocks 50 provided surrounding the pipeline 40 at the entrance of each carrier pipe 39 into the pipeline 40, as illustrated in FIGS. 2 and 3, and include thermal expansion joints 51 located at spaced apart locations along the length of the pipeline, as illustrated in FIGS. 1 and 2. Other engineered components designed to prevent deleterious movement of the pipeline 40 while relieving thermal stresses may be needed and will require site-specific engineering.

Figure 17:
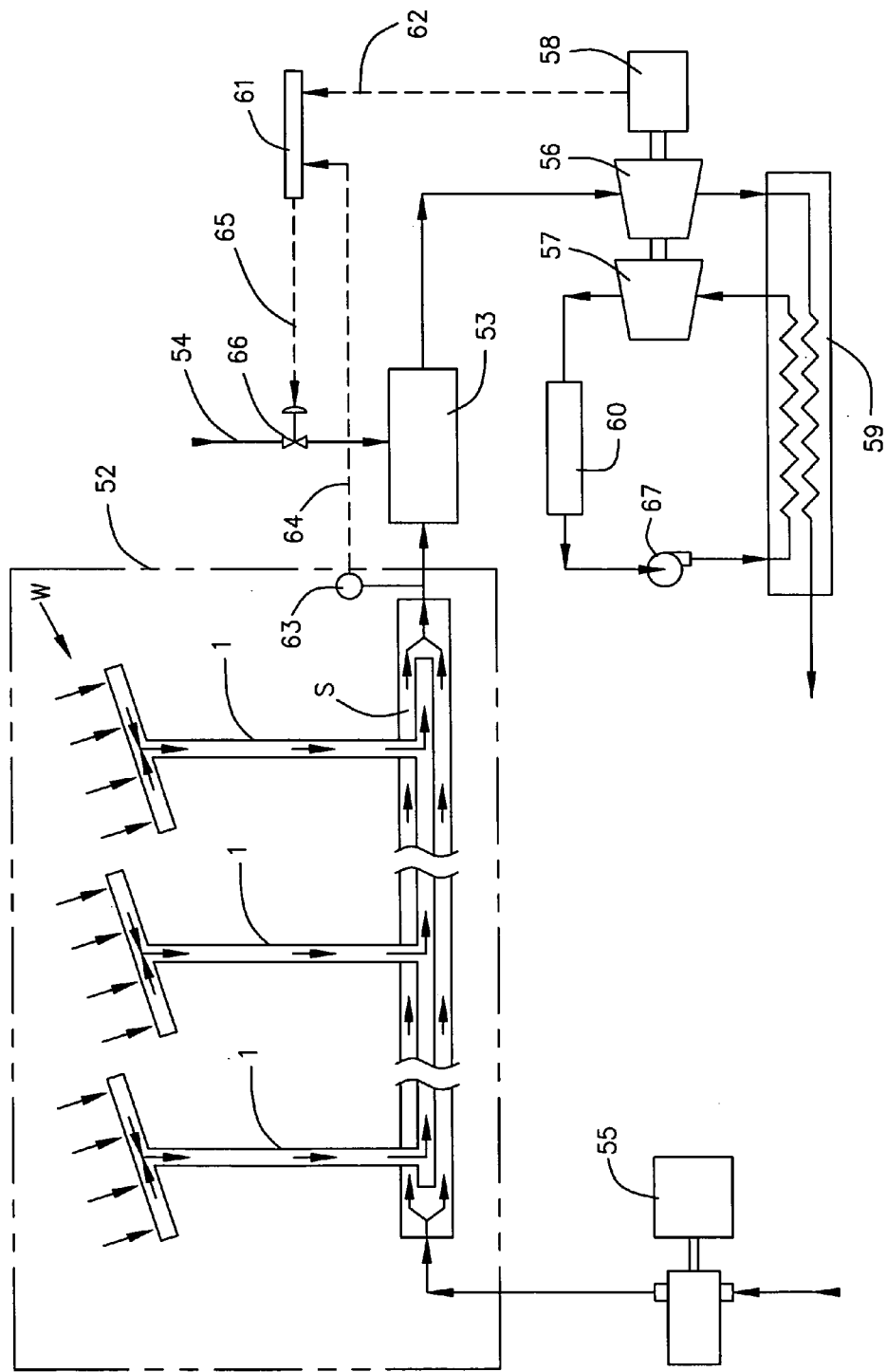
FIG. 17 is a diagram illustrating use of the solar blackbody waveguide of the present invention as a preheater for a modified combined cycle gas turbine.

FIG. 17 illustrates one possible use for the present invention W. FIG. 17 shows the invention W used as a preheater 52 for a combined cycle gas turbine. The preheater in this drawing is the portion within the broken lined box 52. The compression stage of the standard Brayton cycle gas-turbine is detached and the invention W with its solar pipeline 40 and solar collection towers 1 are introduced as an air preheater 52 for the air entering the combustion chamber 53. This preheating effect can be used to reduce the amount of natural gas or other fuel 54 burned in the production of electricity or other co-generation processes. The detached compressor 55 can be a fan compressor type similar to those used in standard gas turbines, a screw type compressor similar to those used in natural gas pipelines, or a piston type compressor if high pressures are required. Since overall turbine efficiency is related to the compression ratio, there may be distinct advantages in using compressors that are able to attain higher working pressures than possible with current turbine compressors.

Other components of existing combine cycle technology illustrated in FIG. 17 are an air turbine 56, a steam turbine 57, a synchronous generator 58, heat recovery steam generator 59, and a steam condenser 60. These existing technologies are leveraged with modifications for higher compression ratios and higher efficiencies permitted by the higher operating pressures.

Due to the variable nature of the energy input by the preheater 52 in FIG. 17, a fuel supply controller 61 is used to modulate the fuel supply 54 flowing to the combustion chamber 61 to provide enough differential power to maintain consistent power output from the generator system 58. In order for it to function, the fuel supply controller 61 receives information from the generator 58 on the amount of electricity being dispatched, as shown by communication line 62, and receives information from a mass flow, thermal energy measurement system 63 on the amount of heat being produced by the preheater 52 prior to combustion of fuel, as shown by communication line 64. Control line 65 shows the fuel supply controller 61 functionally connected to a fuel supply control valve 66 that controls the flow of fuel 54 to the combustion chamber 53. As is typical in the steam or Rankine cycle portion of existing combined cycle plants, water recirculation pump 67 recirculates water from the steam condenser 60 and through the heat recovery steam generator 59 to provide steam for the steam turbine 57.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A solar blackbody waveguide for conversion of solar flux to heat energy comprising:
   a plurality of solar towers,
   solar arrays comprised of a plurality of solar collection cells attached to and supported by each said solar tower, each solar collection cell attached to and provided with means for directing sunlight in parallel light rays into a common light waveguide provided for its associated solar tower,
   each common light waveguide entering into an interior of a hollow, lossy solar coil and guiding light rays to the interior of said lossy solar coil, said lossy solar coil located within an insulated pipeline so that the lossy solar coil extends longitudinally within said insulated pipeline, each of said common light waveguides connected to an associated solar horn provided internally within the solar coil to direct the light rays in one direction and approximately longitudinally into the hollow solar coil where the light rays are absorbed by the solar coil and are converted to heat energy, and
   said pipeline provided internally with an annular space surrounding the outside of the solar coil as a space through which working fluid circulates to remove the heat energy from the solar coil and from which the working fluid can be removed for use as an energy source.

2. A solar blackbody waveguide for conversion of solar flux to heat energy according to claim 1 further comprising:
   each said solar array being movably attached to its associated solar tower, and means for automatically moving said solar arrays to track the sun through its daily movement across the sky and to tilt the solar arrays to the proper angle relative to the horizon for the changing seasons.

3. A solar blackbody waveguide for conversion of solar flux to heat energy according to claim 1 wherein each solar cell further comprises:
   a primary parabolic mirror facing the sun and receiving light rays from the sun, said primary parabolic mirror configured so that it reflects the light rays to a secondary parabolic mirror that faces the primary parabolic mirror, and said secondary parabolic mirror configured so that it reflects light rays received from the primary parabolic mirror as parallel light rays that pass through a hole provided centrally in the primary parabolic mirror and into the a common light waveguide.

4. A solar blackbody waveguide for conversion of solar flux to heat energy according to claim 1 wherein the common light waveguides further comprise:
   optical waveguides connected by optical elbows, optical reducers, and an optical tee so as to form a pathway that guides light rays from the solar cells to the solar horn.

5. A solar blackbody waveguide according to claim 4 wherein the common light waveguides are provided with air gaps through which the light rays pass unimpeded and which provide mechanical clearances to facilitate movement of the solar cells to track the daily and seasonal apparent movement of the sun in the sky.

6. A solar blackbody waveguide for conversion of solar flux to heat energy according to claim 1 wherein the solar horn further comprises:
   a modified elbow for directing light rays approximately longitudinally into the solar coil in a downstream direction.

7. A solar blackbody waveguide for conversion of solar flux to heat energy according to claim 1 further comprising:
   said pipeline being located underground adjacent to said solar towers.

8. A solar blackbody waveguide for conversion of solar flux to heat energy according to claim 7 further comprising:
   said pipeline being insulated externally with a layered composite material consisting of very high temperature refractory fiber insulation materials near the pipeline followed by mineral fiber insulation in the middle and a final exterior coat of poly-urethane insulation material.

9. A solar blackbody waveguide for conversion of solar flux to heat energy according to claim 1 further comprising:
   said common light waveguides being constructed in layers consisting of glass material that is similar to fiber optic material followed by a cladding material with an index of refraction of approximately 1.40 provided over the fiber optic material and an outer coating of thin metallic foil covering the cladding material.

10. A solar blackbody waveguide for conversion of solar flux to heat energy according to claim 1 wherein the solar horn further comprises:
    a prism structure constructed from high-purity and low expansion silica glass.

11. A solar blackbody waveguide for conversion of solar flux to heat energy according to claim 1 further comprising:
    a metal deflector shield provided upstream of each solar horn except the first upstream solar horn as a means for deflecting residual solar flux in the solar coil around the rear ends of the solar horns to minimizing the number of reverse traveling reflections within the solar coil.

12. A method for converting solar flux to heat energy employing a solar blackbody waveguide comprising:
    capturing light rays from the sun in a plurality of solar cells that reflect the sunlight as parallel light rays into a series of common light waveguides,
    guiding the light rays through the common light waveguides to an interior of a hollow solar coil that is provided extending longitudinally inside an insulated pipeline,
    directing the light rays into the hollow solar coil approximately longitudinally within the hollow solar coil via solar horns that are provided within the hollow solar coil in association with each said common light waveguide,
    converting the light rays to heat energy by having the solar coil absorb the light rays,
    transferring the heat energy from the solar coil to a working fluid by circulating the working fluid from an upstream end to a downstream end of the pipeline through an annular space provided internally in the pipeline surrounding the outside of the solar coil, and removing the working fluid from the downstream end of the pipeline for use as a source of heat energy.

13. A method for converting solar flux to heat energy employing a solar blackbody waveguide according to claim 12 further comprising:
moving the solar cells so that each said solar cell tracks the sun through its daily and seasonal apparent movement across the sky to insure that each solar cell is constantly facing the sun.

14. A method for converting solar flux to heat energy employing a solar blackbody waveguide according to claim 12 further comprising:
shielding all but one of the solar horns with metal deflector shields provided upstream of each solar horn except the first upstream solar horn as a means for deflecting residual solar flux in the solar coil around the rear ends of the solar horns to minimizing the number of reverse traveling reflections within the solar coil.

15. A solar blackbody waveguide for conversion of solar flux to heat energy comprising:
one or more solar towers,
solar arrays comprised of a plurality of modularly designed and interconnected solar collection cells attached to each said solar tower, each solar collection cell for assembling ambient solar flux into concentrated parallel rays with increased flux density being attached to and provided with means for assembling and directing solar radiation via short light pipes-lossless waveguides from this plurality of solar collection cells into a common light pipe-lossless waveguide provided for its associated solar tower, each common light pipe-lossless waveguide entering into an interior of a hollow, lossy blackbody waveguide and guiding energy laden, solar flux to the interior of said hollow blackbody waveguide, said blackbody waveguide located within an insulated pipeline so that the blackbody waveguide extends longitudinally within said insulated pipeline, each of said common light waveguides connected to an associated solar horn provided internally within the blackbody waveguide to direct the solar flux in one direction and approximately longitudinally into the hollow blackbody waveguide where the solar energy is absorbed by the lossy, blackbody waveguide due to multiple reflections on the interior of the blackbody wave guide and is converted directly into heat energy, and
said pipeline provided internally with an annular space surrounding the outside of the blackbody waveguide as a space through which working or thermal transfer fluid circulates to remove the heat energy from the blackbody waveguide and from which the working or thermal transfer fluid can be removed for use as an energy source.

16. A solar blackbody waveguide for conversion of solar flux to heat energy according to claim 15 further comprising:
each said solar array being movably attached to its associated solar tower, and means for automatically moving said solar arrays to track the sun through its daily movement across the sky and to tilt the solar arrays to the proper angle relative to the horizon for the changing seasons.

17. A solar blackbody waveguide for conversion of solar flux to heat energy according to claim 15 wherein each solar cell further comprises:
a primary parabolic mirror facing the sun and receiving light rays from the sun, said primary parabolic mirror configured so that it reflects the light rays to a secondary parabolic mirror that faces the primary parabolic mirror, and said secondary parabolic mirror configured so that it reflects light rays received from the primary parabolic mirror as parallel light rays that pass through a hole provided centrally in the primary parabolic mirror and into an individual light pipe-lossless waveguide connected by optical reducers and optical elbows provided for each solar cell, said individual light pipes-lossless waveguides being bundled together providing a means for the introduction of solar flux into a common light pipe-lossless waveguide.

18. A solar blackbody waveguide for conversion of solar flux to heat energy according to claim 17 further comprising:
said solar cells covered with a transparent weather shield permitting the transmission of light rays through the shield but blocking the elements and dust from entering the solar cells and permitting cleaning and routine maintenance.

19. A solar blackbody waveguide for conversion of solar flux to heat energy according to claim 15 wherein the common light waveguides further comprise:
optical light pipes-lossless waveguides connected by optical elbows, optical reducers, and an optical tee so as to form a pathway that guides light rays assembled from the solar cells to the solar horn.

20. A solar blackbody waveguide according to claim 19 wherein the common light pipes-lossless waveguides are provided with air gaps through which the light rays pass unimpeded, said air gaps permitting mechanical clearances to facilitate tracking of the sun's apparent daily and seasonal movements in the sky.

21. A solar blackbody waveguide for conversion of solar flux to heat energy according to claim 15 wherein the solar horn further comprises:
a modified solar elbow for directing light rays approximately longitudinally into the solar blackbody waveguide.

22. A solar blackbody waveguide for conversion of solar flux to heat energy according to claim 15 further comprising:
said insulated pipeline being located above ground or underground adjacent to said solar towers.

23. A solar blackbody waveguide for conversion of solar flux to heat energy according to claim 22 further comprising:
said pipeline being insulated externally with a layered composite material consisting of very high temperature refractory fiber insulation materials near the pipeline followed by mineral fiber insulation in the middle and a final exterior coat of poly-urethane insulation material.

24. A solar blackbody waveguide for conversion of solar flux to heat energy according to claim 15 further comprising:
said common light pipes-lossless waveguides being constructed in layers consisting of glass material that is similar to fiber optic material followed by a cladding material with an index of refraction of approximately 1.40 provided over the fiber optic material and an outer coating of thin metallic foil covering the cladding material.

25. A solar blackbody waveguide for conversion of solar flux to heat energy according to claim 15 wherein the solar horn further comprises:
a prism structure constructed from high-purity and low expansion silica glass.

26. A solar blackbody waveguide for conversion of solar flux to heat energy according to claim 15 further comprising:
a metal deflector shield provided upstream of each solar horn except the first upstream solar horn as a means for deflecting residual solar flux in the solar blackbody waveguide around the rear ends of the solar horns to minimize the number of reverse traveling reflections within the solar blackbody waveguide.

27. A solar blackbody waveguide for conversion of solar flux to heat energy according to claim 15 further comprising:
each solar tower being a means of structural support for the plurality of solar cells assembled into a solar array via central column and movable structural spar elements, and providing a means for the support, assembly and bundling of individual light pipes-lossless waveguides from each of associated plurality of solar cells and directing the light rays thereby transmitted into a common light pipe-lossless waveguide connecting the solar cells to the solar horn, and providing a means for the structural support of said common light pipe-lossless waveguide, and providing a means for interfacing PLC computer controlled, mechanical drive system to the solar array for the purpose of automatically tracking the sun through its daily movements across the sky and to tilt the solar arrays to the proper angle relative to the horizon for the changing seasons.

28. A method for converting solar flux to heat energy employing a solar blackbody waveguide comprising:
capturing light rays from the sun in a plurality of solar cells that reflect the sunlight into a series of individual light pipes-lossless waveguides,
assembling and guiding these light rays for this plurality of solar cells into the common light pipes-lossless waveguides to an interior of a hollow, lossy, blackbody waveguide that is provided extending longitudinally inside an insulated pipeline,
directing the light rays into the hollow, lossy, blackbody waveguide approximately longitudinally within the hollow, lossy, blackbody waveguide via solar horns that are provided within the hollow, lossy, blackbody waveguide in association with each said common light pipe-lossless waveguide,
converting the light rays to heat energy by having the lossy, blackbody waveguide absorb the light rays via multiple reflections inside of the hollow, lossy, blackbody waveguide,
transferring the heat energy from the blackbody waveguide to a working or thermal fluid by circulating the working fluid from an upstream end to a downstream end of the pipeline through an annular space provided internally in an insulated pipeline surrounding the outside of the lossy, blackbody waveguide, and
removing the working or thermal fluid from the downstream end of the pipeline for use as a source of heat energy.

29. A method for converting solar flux to heat energy employing a solar blackbody waveguide according to claim 28 further comprising:
moving the solar cells so that each said solar cell tracks the sun through its daily movement across the sky and tilts to maintain the proper angle relative to the horizon so that each solar cell is constantly facing the sun.

30. A method for converting solar flux to heat energy employing a solar blackbody waveguide according to claim 28 further comprising:
shielding all but one of the solar horns with metal deflector shields provided upstream of each solar horn except the first upstream solar horn as a means for deflecting residual solar flux in the solar coil around the rear ends of the solar horns to minimizing the number of reverse traveling reflections within the solar coil.

\* \* \* \* \*